(12) United States Patent
Mani

(10) Patent No.: US 12,437,661 B2
(45) Date of Patent: Oct. 7, 2025

(54) DRONE CLASSIFICATION DEVICE AND METHOD OF CLASSIFYING DRONES

(71) Applicant: Intel Corporation, Santa Clara, CA (US)

(72) Inventor: Maya Mani, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 17/352,522

(22) Filed: Jun. 21, 2021

(65) Prior Publication Data

US 2022/0415191 A1 Dec. 29, 2022

(51) Int. Cl.
| | |
|---|---|
| *G08G 5/00* | (2006.01) |
| *G01S 7/41* | (2006.01) |
| *G01S 13/91* | (2006.01) |
| *G08G 5/72* | (2025.01) |

(52) U.S. Cl.
CPC .............. *G08G 5/723* (2025.01); *G01S 7/412* (2013.01); *G01S 13/91* (2013.01)

(58) Field of Classification Search
None
See application file for complete search history.

(56) References Cited

U.S. PATENT DOCUMENTS

| | | | | |
|---|---|---|---|---|
| 9,337,889 | B1* | 5/2016 | Stapleford | H04B 1/707 |
| 9,767,699 | B1* | 9/2017 | Borghese | G08G 5/0082 |
| 9,797,978 | B1* | 10/2017 | Melamed | G01R 29/10 |
| 10,249,202 | B1* | 4/2019 | Passe | G08G 5/0082 |
| 10,281,570 | B2* | 5/2019 | Parker | G08G 5/0013 |
| 10,739,451 | B1* | 8/2020 | Parker | G01S 7/414 |
| 11,022,407 | B2* | 6/2021 | Whitmarsh | G08G 5/0069 |
| 11,828,836 | B1* | 11/2023 | Dana | G01S 7/415 |
| 2008/0088508 | A1* | 4/2008 | Smith | G01S 13/878 |
| | | | | 342/453 |
| 2011/0267222 | A1* | 11/2011 | Craig | G01S 3/04 |
| | | | | 342/28 |
| 2014/0139366 | A1* | 5/2014 | Moses | G01S 13/536 |
| | | | | 342/63 |

(Continued)

FOREIGN PATENT DOCUMENTS

| | | | | |
|---|---|---|---|---|
| CN | 110850385 A | * | 2/2020 | .............. G01S 7/411 |
| CN | 110850386 A | * | 2/2020 | .............. G01S 7/415 |

OTHER PUBLICATIONS

"MathWorks Brand Guidelines"; no author given no date; retrieved on Aug. 12, 2024; posted on the Internet at mathworks.com; Mathworks; Natick, MA, USA. (Year: 2024).*

(Continued)

*Primary Examiner* — Bernarr E Gregory
(74) *Attorney, Agent, or Firm* — Viering, Jentschura & Partner mbB

(57) ABSTRACT

A drone classification device is provided. The drone classification device includes a radio signal receiver configured to receive a radio signal, and a radio signal analyzer configured to determine physical characteristics of the received radio signal, to compare the determined physical characteristics of the received radio signal with a plurality of reference characteristics, each reference characteristics describing a drone class of a plurality of drone classes, and to classify a drone into a drone class of a plurality of drone classes depending on a result of the comparison.

18 Claims, 7 Drawing Sheets

(56) References Cited

U.S. PATENT DOCUMENTS

| | | | | |
|---|---|---|---|---|
| 2015/0302858 A1* | 10/2015 | Hearing | ............... | G01H 1/00 |
| | | | | 381/58 |
| 2015/0350228 A1* | 12/2015 | Baxley | ............... | H04L 63/1483 |
| | | | | 726/23 |
| 2015/0350914 A1* | 12/2015 | Baxley | ............... | H04W 72/20 |
| | | | | 726/11 |
| 2016/0086621 A1* | 3/2016 | Hearing | ............... | H04R 29/00 |
| | | | | 340/943 |
| 2016/0118059 A1* | 4/2016 | Hearing | ............... | G01S 5/18 |
| | | | | 381/56 |
| 2016/0189732 A1* | 6/2016 | Hearing | ............... | G10L 25/51 |
| | | | | 381/56 |
| 2017/0094527 A1* | 3/2017 | Shattil | ............... | H04K 3/92 |
| 2017/0148467 A1* | 5/2017 | Franklin | ............... | G10L 25/39 |
| 2018/0081354 A1* | 3/2018 | Magy | ............... | G08G 5/0082 |
| 2019/0137605 A1* | 5/2019 | Harman | ............... | G01S 7/415 |

OTHER PUBLICATIONS

"Who We Are: Our Brands"; no author given; copyright year 2024; posted on the Internet at wi-fi.org; Wi-Fi Alliance; Austin, TX, USA. (Year: 2024).*

"PSF Trademark Usage Policy"; no author given; publicly released in the year 2007; posted on the Internet at python.org; Python Software Foundation; Wilmington, DE, USA. (Year: 2007).*

* cited by examiner

| | Source | Time | Destination | Protocol Length |
|---|---|---|---|---|
| 1 | ParrotSa_38:4b:35 | 0.000000 | EdimaxTe_ae:d5:bf | 802:11 |
| 2 | ParrotSa_38:4b:35 | 0.901294 | EdimaxTe_ae:d5:bf | 802:11 |
| 3 | ParrotSa_38:4b:35 | 0.002665 | EdimaxTe_ae:d5:bf | 802:11 |
| 4 | ParrotSa_38:4b:35 | 0.992095 | EdimaxTe_ae:d5:bf | 802:11 |
| 5 | ParrotSa_38:4b:35 | 0.003305 | EdimaxTe_ae:d5:bf | 802:11 |
| 6 | | 0.151394 | ParrotSa_38:4b:35 (90:3a:e6:38:4b:35 (RA) | 802:11 |
| 7 | | 0.781698 | ParrotSa_38:4b:35 (90:3a:e6:38:4b:35 (RA) | 802:11 |
| 8 | | 0.794814 | ParrotSa_38:4b:35 (90:3a:e6:38:4b:35 (RA) | 802:11 |
| 9 | | 2.295353 | ParrotSa_38:4b:35 (90:3a:e6:38:4b:35 (RA) | 802:11 |
| 10 | | 2.334088 | ParrotSa_38:4b:35 (90:3a:e6:38:4b:35 (RA) | 802:11 |
| 11 | ParrotSa_38:4b:35 | 2.426782 | MurataMa_f3:7b:5d | 802:11 |
| 12 | ParrotSa_38:4b:35 | 2.427510 | MurataMa_f2:7b:5d | 802:11 |
| 13 | | 2.576694 | ParrotSa_38:4b:35 (90:3a:e6:38:4b:35 (RA) | 802:11 |
| 14 | | 3.462156 | ParrotSa_38:4b:35 (90:3a:e6:38:4b:35 (RA) | 802:11 |
| 15 | ParrotSa_38:4b:35 | 3.558855 | EdimaxTe_ae:d5:bf | 802:11 |
| 16 | ParrotSa_38:4b:35 | 3.559622 | EdimaxTe_ae:d5:bf | 802:11 |
| 17 | ParrotSa_38:4b:35 | 3.569445 | EdimaxTe_ae:d5:bf | 802:11 |
| 18 | ParrotSa_38:4b:35 | 3.560826 | EdimaxTe_ae:d5:bf | 802:11 |
| 19 | | 6.652684 | ParrotSa_38:4b:35 (90:3a:e6:38:4b:35 (RA) | 802:11 |
| 20 | ParrotSa_be:ds:64 | 6.658395 | ParrotSa_38:4b:35 | 802:11 |
| 21 | ParrotSa_38:4b:35 | 6.703429 | EdimaxTe_ae:d5:bf | 802:11 |
| 22 | ParrotSa_38:4b:35 | 6.704774 | EdimaxTe_ae:d5:bf | 802:11 |
| 23 | ParrotSa_38:4b:35 | 6.707133 | EdimaxTe_ae:d5:bf | 802:11 |
| 24 | ParrotSa_38:4b:35 | 6.708268 | EdimaxTe_ae:d5:bf | 802:11 |
| 25 | | 6.779928 | ParrotSa_38:4b:35 (90:3a:e6:38:4b:35 (RA) | 802:11 |
| 26 | ParrotSa_38:4b:35 | 8.693220 | Broadcast | 802:11 |
| 27 | ParrotSa_38:4b:35 | 9.412354 | Broadcast | 802:11 |
| 28 | ParrotSa_38:4b:35 | 10.022772 | EdimaxTe_ae:d5:bf | 802:11 |
| 29 | | 10.087429 | ParrotSa_38:4b:35 (90:3a:e6:38:4b:35 (RA) | 802:11 |
| 30 | ParrotSa_38:4b:35 | 10.156192 | EdimaxTe_ae:d5:bf | 802:11 |
| 31 | ParrotSa_38:4b:35 | 10.159592 | EdimaxTe_ae:d5:bf | 802:11 |
| 32 | ParrotSa_38:4b:35 | 10.160204 | EdimaxTe_ae:d5:bf | 802:11 |
| 33 | ParrotSa_38:4b:35 | 10.161092 | EdimaxTe_ae:d5:bf | 802:11 |
| 34 | ParrotSa_38:4b:35 | 11.448747 | 22:46:9a:a0:c9:1b | 802:11 |
| 35 | ParrotSa_38:4b:35 | 11.662017 | e6:3e:49:99:91:2f | 802:11 |
| 36 | ParrotSa_38:4b:35 | 11.667957 | Broadcast | 802:11 |
| 37 | ParrotSa_38:4b:35 | 12.175080 | Broadcast | 802:11 |
| 38 | | 13.496586 | ParrotSa_38:4b:35 (90:3a:e6:38:4b:35 (RA) | 802:11 |
| 39 | ParrotSa_38:4b:35 | 13.479650 | EdimaxTe_ae:d5:bf | 802:11 |
| 40 | ParrotSa_38:4b:35 | 14.874804 | 2a:78:61:ff:b3:8b | 802:11 |
| 41 | ParrotSa_38:4b:35 | 14.956093 | 2a:78:61:ff:b3:8b | 802:11 |

DRONE CLASSIFICATION DEVICE AND METHOD OF CLASSIFYING DRONES

TECHNICAL FIELD

Various embodiments relate generally to a watchdog circuit, to a system-on-chip, to a method of operating a watchdog circuit, and to a method of operating a system-on-chip.

BACKGROUND

A presence of a drone in a certain area may be known or suspected. However, a class of the drone, e.g., manufacturer, type, etc., may be unknown.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

Figure 3A:
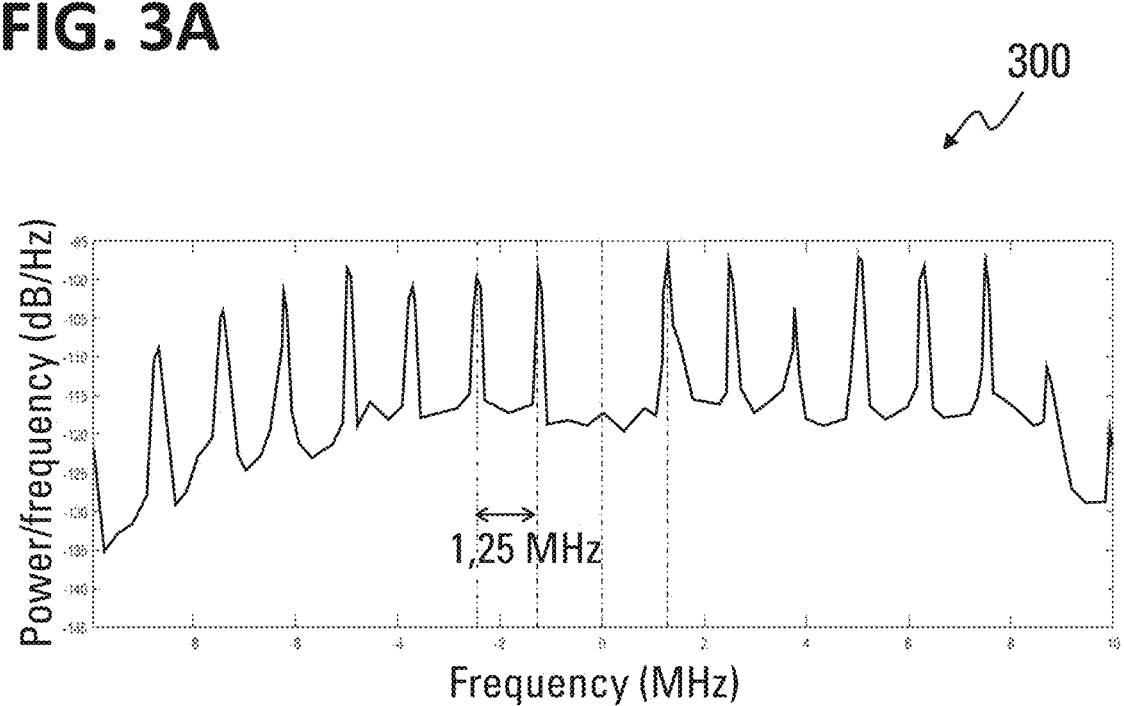
Figure 3B:
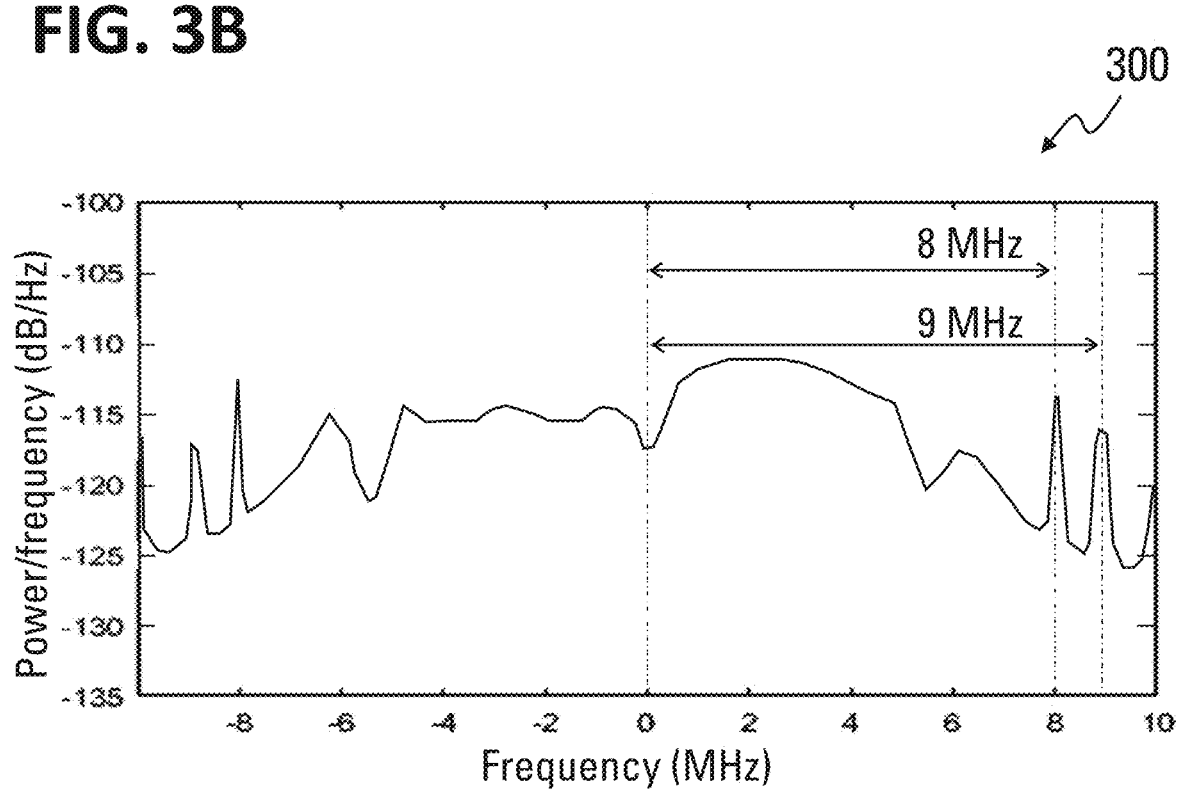
Figure 3C:
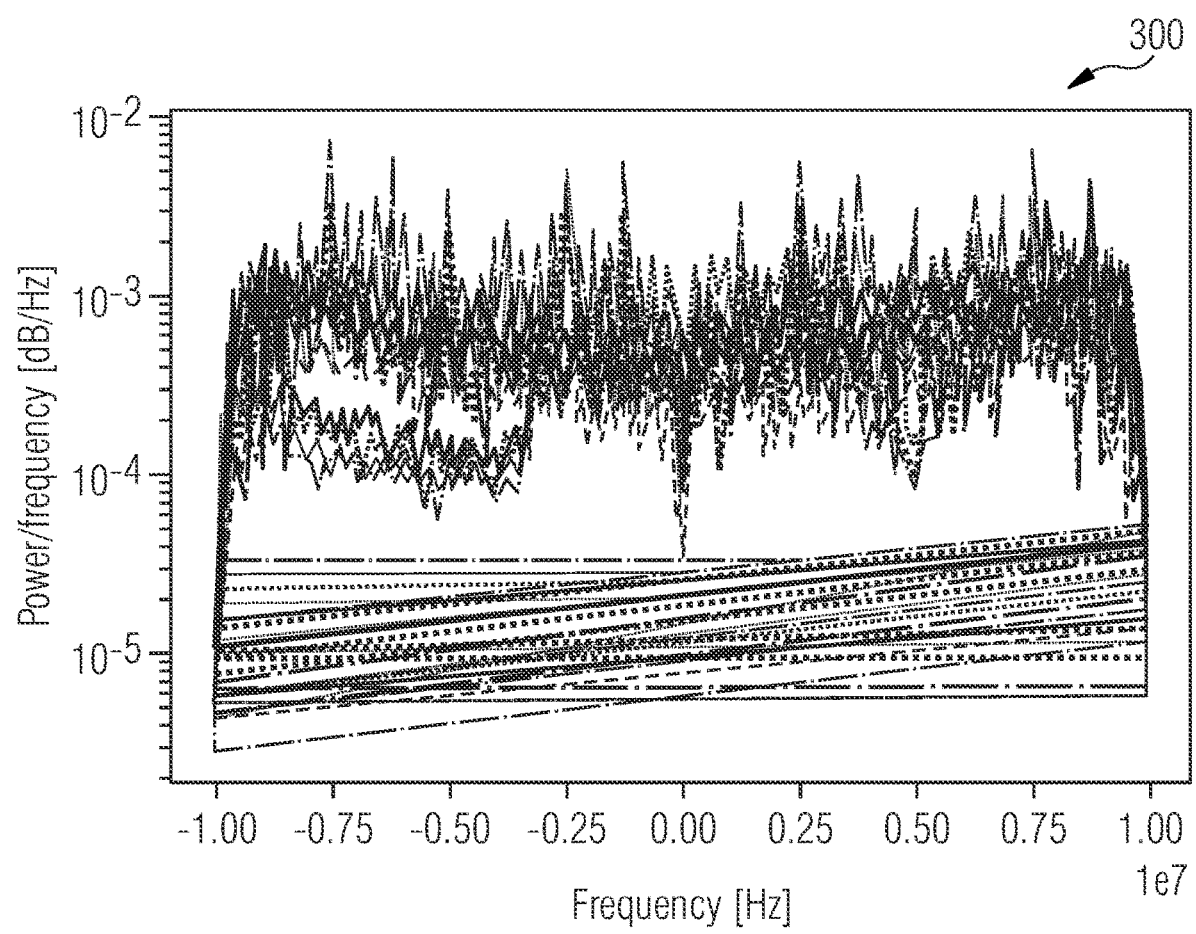
Figure 4A:
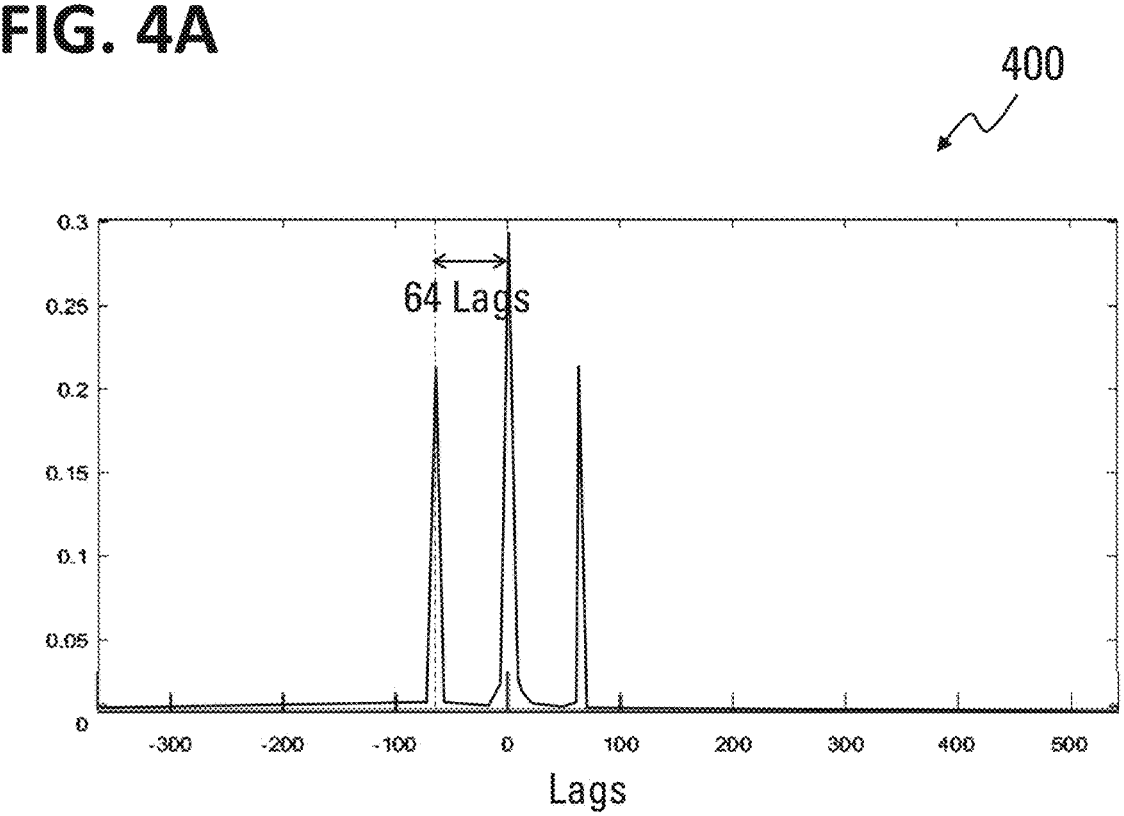
Figure 4B:
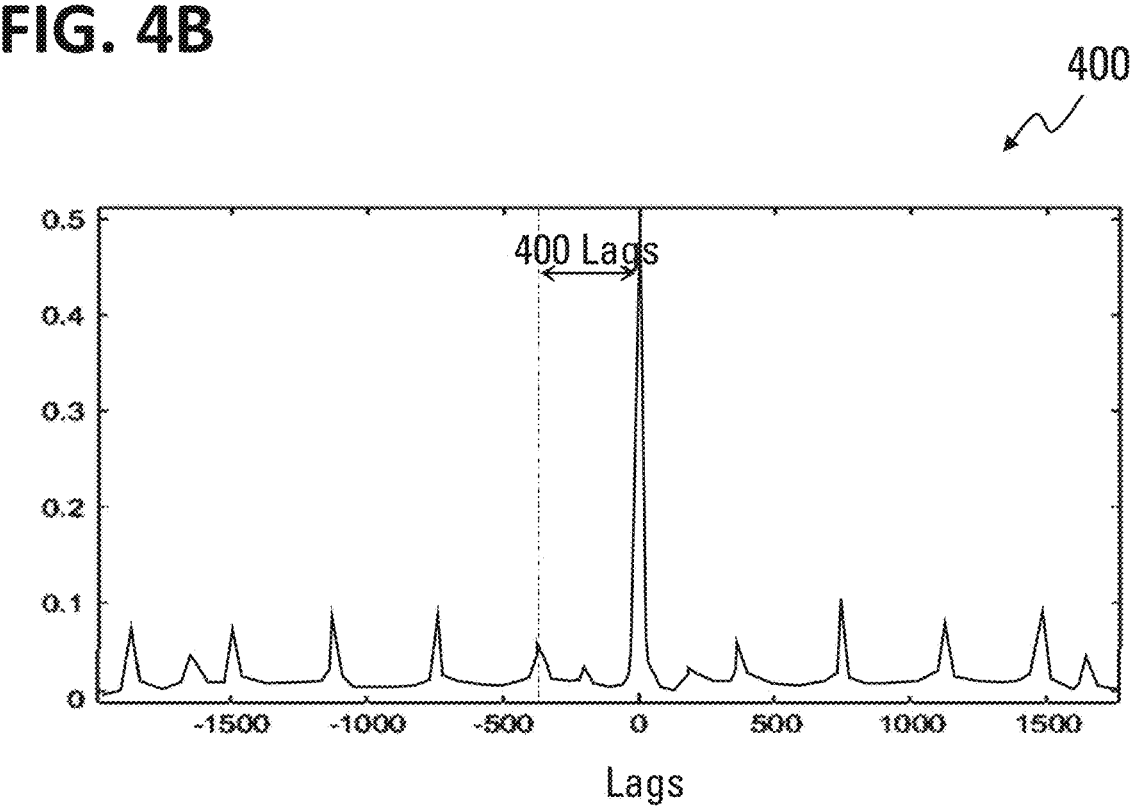
Figure 5:
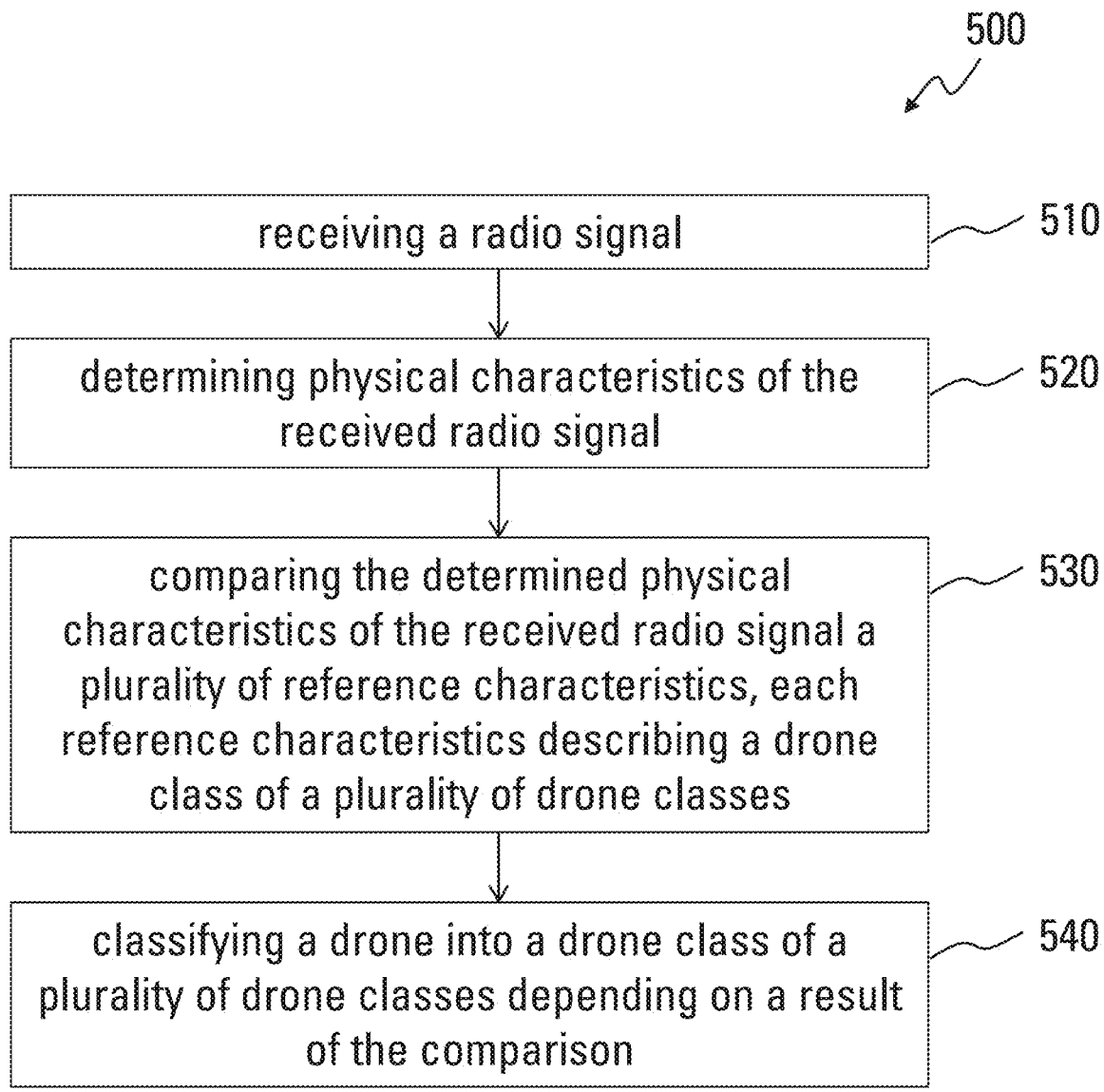

each of FIG. 3A to FIG. 3C shows a power spectrum of a radio signal created as part of an analysis performed in a radio signal analyzer included in the drone classification device in accordance with various embodiments;

each of FIG. 4A and FIG. 4B shows an autocorrelation of a radio signal created as part of an analysis performed in a radio signal analyzer included in the drone classification device in accordance with various embodiments;

FIG. 5 shows a flow diagram of a method of classifying drones in accordance with various embodiments; and FIG. 6 shows a table listing encoded/transmitted information extracted from Wi-Fi® (i.e., wireless local area network) data packets sent to or by drones.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The term "drone" as used herein refers to an unmanned, remote controlled vehicle, for example an unmanned aerial vehicle (UAV).

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

In various embodiments, detecting/identifying and classifying drones based on their unique RF signatures may make use of cyclostationary radio frequency (RF) signal analysis and signal processing algorithms.

In various embodiments, the RF signature characterized by modulation and protocol (for example without actually decoding the protocol) may serve as a basis for identifying a drone.

More specifically, rather than extracting information encoded in the RF signal, classifying a drone may include executing an analysis of physical properties of the RF signal itself, and comparing a result of the analysis to physical properties of known references, for which a drone classification, e.g., a manufacturer and/or a model, type, year, etc., may be known.

Drone Detection and Classification (DDC) may in various embodiments refer to algorithms, e.g. MATLAB® (i.e., multi-paradigm programming language and numeric computing environment) algorithms, and models, e.g. Python® (i.e., programming language) models, designed for detecting and classifying drones based on RF signal features that may be characteristic for a modulation and a protocol used by the drones in communication, for example in communication with a control device.

Cyclostationary feature detection algorithms may in various embodiments be used to classify RF signals for example based on locations of peaks in a Spectral Correlation Function (SCF) of the RF signals.

Figure 1:
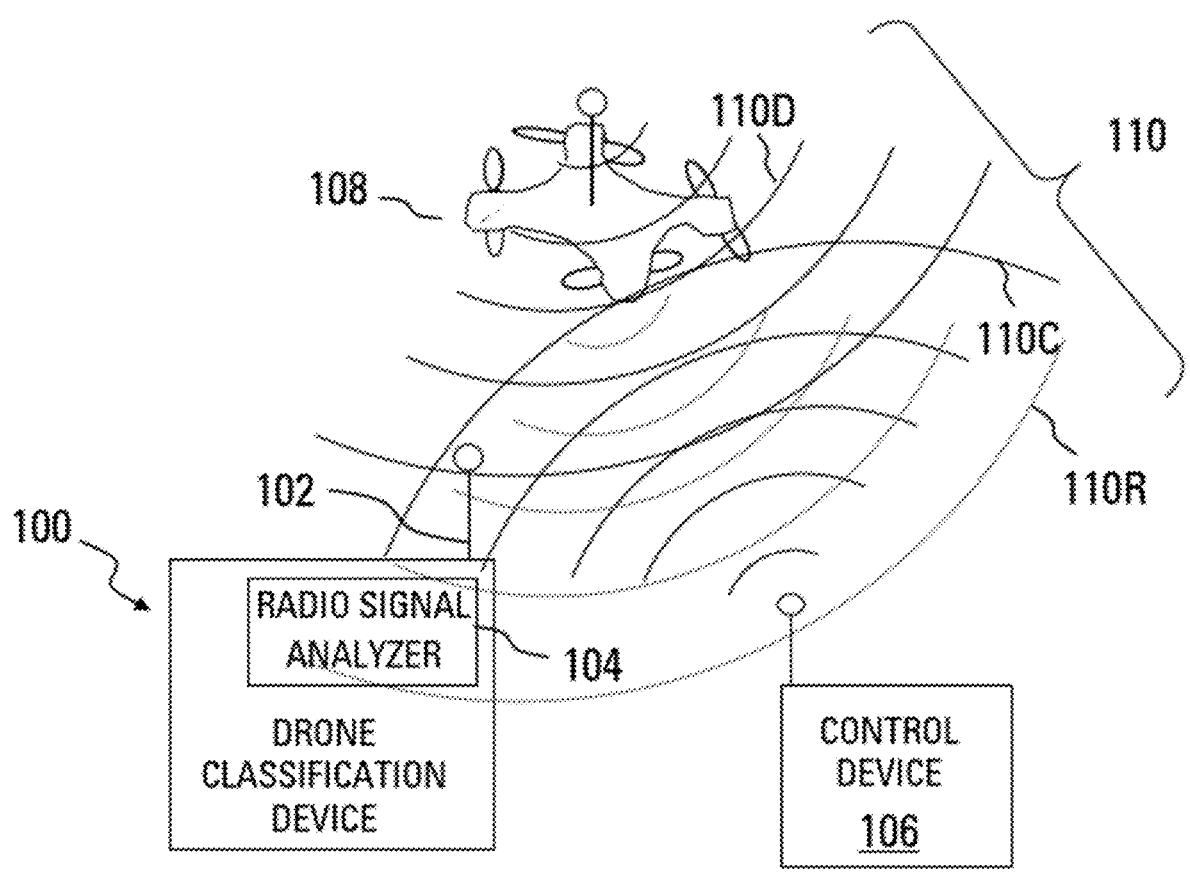
FIG. 1 shows a schematic illustration of a drone classification device in accordance with various embodiments receiving radio signals from a drone and/or signals directed at a drone.

FIG. 1 shows a schematic illustration of a drone classification device 100 in accordance with various embodiments. The drone classification device 100 may be configured to receive radio signals 110 from a drone 108 (for example, a radio signal 110D that is actively transmitted by the drone 108, and/or a radio signal 110R that is reflected off the drone 108), and/or signals 110C directed at the drone 108, for example by a control device 106. The radio signal(s) may for example be or include cyclostationary radio signals. A receiver of the drone 108 and a transmitter of the control device 106 (each of which or both may optionally be a transceiver) are symbolized as antennas in FIG. 1.

The drone classification device 100 may include a radio signal receiver 102 configured to receive a radio signal 110, e.g. any or all of the radio signals 110C, 110R, and 110D (referred to as the radio signal(s) 110). At least for commercial drones 108, a carrier frequency of the received radio signal may typically lie in one of the so-called ISM-bands, for example in a range from about 2 GHz to about 6 GHz, for example between 2.4 GHz and 2.5 GHz and/or between 5.725 GHz and 5.875 GHz. More generally, the radio signal receiver 102 may be configured to receive a radio signal 110 of any frequency that may be of interest in the present context. Even though the radio signal receiver 102 is symbolized by an antenna 102, it is to be understood that the signal 102 includes all the hard- and software that is needed for receiving the radio signal 110 and for providing it for further processing, for example to a radio signal analyzer 104 included in the drone classification device 100 and configured to determine physical characteristics of the radio signal 110 that was received by the radio signal receiver 102.

The physical characteristics of the radio signal 110 that are determined are to be understood to refer to sheer physical characteristics/properties of the radio signal 110, as opposed to an information content that is transmitted by the radio signal 110, e.g. as information encoded as deliberately controlled alternating physical properties. In other words, for the determining of the physical characteristics, a decoding of the radio signal 110 to retrieve the transmitted information is omitted (even though the information, e.g. MAC layer data or the like, may optionally be decoded and analyzed in addition to the determining of the physical characteristics). FIG. 6 shows a table 600 including encoded information that may typically be transmitted to/by drones, like for example a source of the signal, a time, a destination, and a protocol length. The method of classifying drones may in various embodiments be used in a case where a Wi-Fi® (i.e., wireless local area network) signal that is transmitted to/by a drone is detected, but information comparable to the information included in table 600 may not be decoded, for example because the information is deliberately hidden. In particular in such a case, the drone classification may be determined from the physical characteristics of the RF signal.

The result of the analysis, in other words, the physical characteristics that have been determined, may for example include any element or combination of elements of the following group (or others not mentioned here): at least one carrier frequency of the received radio signal, locations of peaks in a spectral correlation function of the received radio signal, a characteristic time of using a first carrier frequency in the received radio signal before switching to a different second carrier frequency (also referred to as frequency hopping, which may often be applied to avoid interference and/or eavesdropping), and a frequency shift in the received radio signal caused by motions of the drone.

The radio signal analyzer 104 may further be configured to compare the determined physical characteristics to at least one reference characteristic describing a (known) drone class of a plurality of drone classes, and to classify a drone into a drone class of a plurality of drone classes depending on a result of the comparison.

For some or many of the physical characteristics that are determinable from the radio signal 110, corresponding values for the comparison may not be available from publications of drone manufacturers, because for example frequency hopping patterns may be confidential, and drone protocols may be proprietary.

However, the physical characteristics may for example be determined essentially as described above in a lab-type environment for one or more reference drones, thereby forming the reference characteristics (also referred to simply as references). The references may for example be stored in a database that assigns one or more drone classes (e.g., the manufacturer, series, type, model, year of manufacturing, etc.) to each of the physical characteristics.

In various embodiments, the analysis, e.g. the determining of the physical characteristics, may include any combination selected from the following group of processes performed on the received radio signal, and optionally further processes: creating a spectral correlation function, creating a periodogram, autocorrelating the received radio signal, creating a spectrogram, applying a wavelet transform, applying a time smoothing algorithm, creating a spectral kurtosis, and creating a power cepstrum.

In general, the processes may be or include radio signal 110 analysis/processes that are, in a general sense, known to a person skilled in the art.

The determining the physical characteristics, which may for example be directed at cyclostationary feature detection, may for example include any combination of the following processes/analyses: Spectral Correlation Function (SCF), Cyclic Autocorrelation Function (CAF), FFT Accumulation Method (FAM), Strip Spectral Correlation Analyzer (SSCA), Power Spectral Density (PSD), periodogram, spectrogram, statistical moments like for example variance, kurtosis, standard deviation, skewness, and entropy, modulation recognition, cepstrum (e.g., to detect drone body acoustics like vibrations or the like), and wavelet transform (e.g., to detect drone body movements).

Figure 2A:
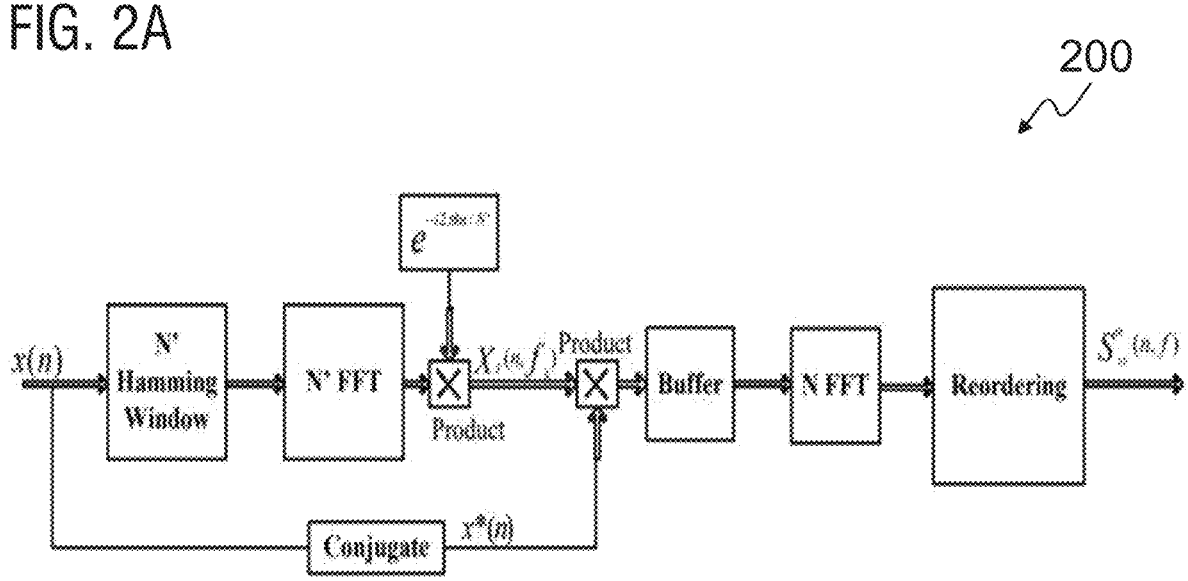
FIG. 2A shows a schematic illustration of an analysis performed in a radio signal analyzer included in the drone classification device in accordance with various embodiments, and FIG. 2B displays the results graphically.
Figure 2B:
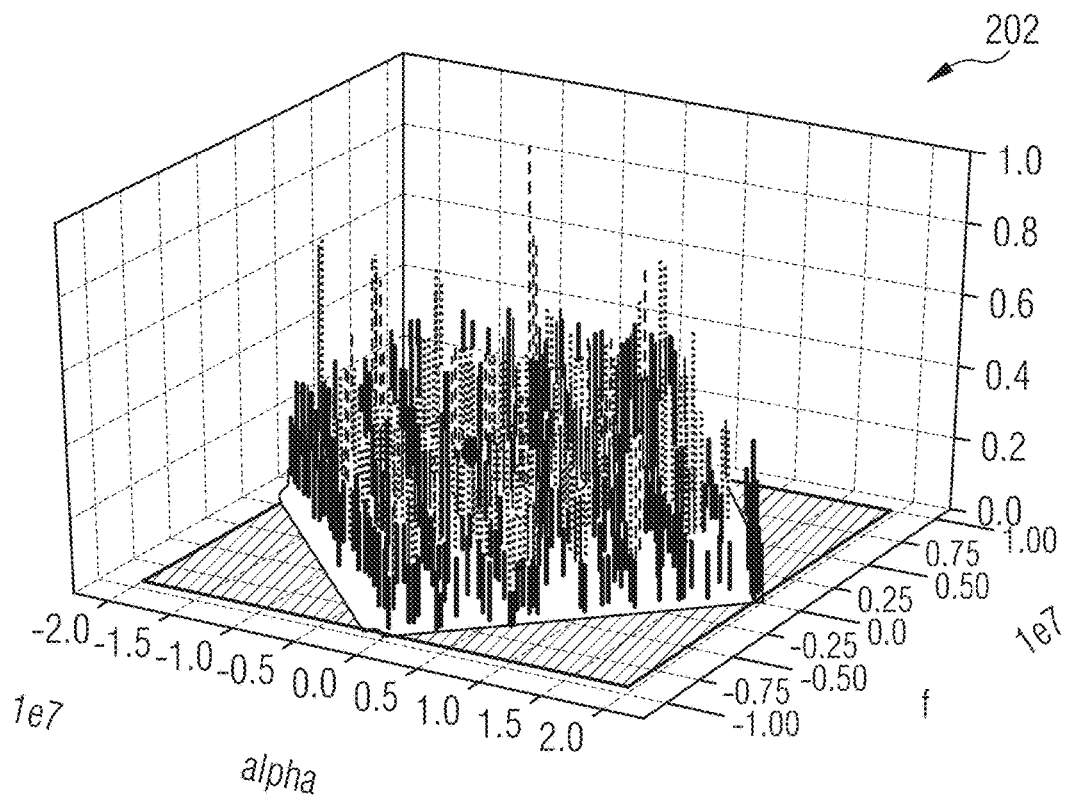

FIG. 2A, which shows a Strip Spectral Correlation Analyzer (SSCA) block diagram, is to be understood to serve only as an illustrative example of a possible determining of physical characteristics of the received radio signal 110 that may be performed in the radio signal analyzer 104, and FIG. 2B shows an exemplary spectral correlation analysis result that was obtained during a test of the method of classifying drones in accordance with various embodiments (for explaining the physical characteristics that may be determined from this kind of analysis results, symbolic spectra highlighting the relevant features are provided in FIGS. 3A, 3B, 4A and 4B).

Some basic information regarding exemplary processes for determining the physical characteristics are provided in the following:

The time-domain Cyclic Autocorrelation Function (CAF) is given by:

$$R_x^\alpha(\tau) \triangleq \lim_{T\to\infty} \frac{1}{T} \int_{-\frac{T}{2}}^{\frac{T}{2}} x\left(t+\frac{\tau}{2}\right) x*\left(t-\frac{\tau}{2}\right) e^{-j2\pi\alpha t} dt$$

A corresponding frequency-domain of the CAF is the Spectral Correlation Function (SCF, also known as Cyclic Spectral Density (CSD) or Cyclic Spectrum) and is given by:

$$S_x^\alpha(f) \triangleq \mathcal{F}\{R_x^\alpha(\tau)\} = \lim_{T\to\infty}\frac{1}{T} X_T\left(f+\frac{\alpha}{2}\right) X_T^*\left(f-\frac{\alpha}{2}\right)$$

SCF estimator algorithms may include an FFT Accumulation Method (FAM) and a Strip Spectral Correlation Analyzer (SSCA), both of which are time smoothing methods.

Signal processing for extracting the signal features (e.g., the physical characteristic) ma include cyclostationary signal processing techniques.

The following formula describes the FH/PSK waveform for a single hop frequency:

$$x(t)=m(t)d(t)e^{-j2\pi f_1 t}$$

wherein m(t)=±1 is the PSK data, and d(t)=0, 1 is the hop on/off pulse.

The following formula describes the cyclic spectrum of the combined FH/PSK data:

$$S_x^\alpha(f) = \frac{1}{T_h} \sum_{n,m} X_n X_m^* \delta\left(f+\frac{\alpha}{2}-nf_h\right)\delta\left(f-\frac{\alpha}{2}-mf_h\right)$$

wherein $S_x^\alpha(f)$ is only non-zero for integer multiples of the hop rate.

The SCF of PSK data $d(t)\cos(2\pi f_0 t+\phi_0)$ is shown to be the data spectrum at the cosine terms:

$$S_x^\alpha(f) = \begin{cases} \frac{1}{4}S_d^\alpha(f-f_0) + \frac{1}{4}S_d^\alpha(f+f_0); & \alpha = 0 \\ \frac{1}{4}e^{\pm j2\phi_0}S_d^\alpha(f); & \alpha = \pm 2f_0 \end{cases}$$

The SCF of Frequency Hopping data for a single hop $X(t)=d(t)e^{-j2\pi f_1 t}$ is:

$$S_x^\alpha(f) = \begin{cases} \frac{1}{\Delta t} T_h^2 \text{Sinc}^2((f+f_1)T_h); & \alpha = 0 \\ 0; & \text{otherwise} \end{cases}$$

A wavelet analysis may for example be used to detect discrete events in time and frequency. The wavelet analysis may, for example, detect location and duration of an event. Detecting a frequency hop time and a hop duration for FHSS signals, and drone 108 body vibrations and shifting during pitch, yaw and roll events when the drone 108 changes direction and/or altitude, may include the wavelet analysis in the time domain. Physical characteristics related to drone 108 motion may rely on the radio signals 110D, 110R originating at the drone 108, either as the radio signals 110D emitted by the drone 108, or as the radio signals 110R reflected by the drone 108, whereas determining other classification details like type, class, etc. of the drone 108 may rely on the radio signal 110C transmitted from the control device 106 to the drone 108.

The radio signal receiver 102 may for example include a commercially available radio signal receiver 102, like for example a software defined radio (SDR) device, which may for example support reception and transmission of radio signals in a range between 1 MHz and 6 GHz, or a dedicated radio signal receiver 102 configured to receive any radio frequencies that may be of interest for the drone classification device 100. At least the commercially available radio signal receivers 102 may include certain analysis capabilities, which may form part of the radio signal analyzer 104.

In various embodiments, identifying unique features of drone RF signal in, for example, the spectral correlation function, the autocorrelation, and/or the power spectrum may make use of Python® (i.e., programming language) code implementation of proprietary MATLAB® (i.e., multi-paradigm programming language and numeric computing environment) algorithms, which may be provided in conjunction with the software defined radio (or other dedicated analysis hard- and/or software).

In various embodiments, matching, as the determining of the physical characteristics, the received radio signal 110 with pre-defined physical characteristics, and/or matching the processed received radio signal 110, e.g. the power spectrum, the autocorrelation, etc., with the drone classification may make use of a trained machine learning model.

Experiments were conducted using a software defined radio (SDR) device with the Python® (i.e., programming language) code and the MATLAB® (i.e., multi-paradigm programming language and numeric computing environment) algorithms in the drone classification device 100. Two commercially available quadcopter-type drones 100 (referred to as drone A and drone B) were used for populating the database with their respective physical characteristics, and for determining said characteristics from radio signals 110 received from the drones 108 and/or their respective control devices 106.

As a visual example, each of FIG. 3A and FIG. 3B shows a symbolic power spectrum 300 of a radio signal, wherein the power spectrum 300 was created for determining the physical characteristics in a radio signal analyzer 104 included in the drone classification device 100 in accordance with various embodiments (a more realistic power spectrum as obtained during an experimental test of the method of classifying drones is shown in FIG. 3C; FIG. 3A and FIG. 3B show symbolic power spectra highlighting the relevant features). The power spectrum in FIG. 3A originates from drone A, and the power spectrum in FIG. 3B originates from drone B.

Each of the power spectra 300 shows the power per unit of frequency transmitted by the respective radio signal 100, wherein the frequency is labelled as a frequency offset with respect to a central frequency of 2.412 GHz. Peaks in the power spectra 300 may correspond to frequencies that may serve as a carrier frequency when the frequency hopping spread spectrum is applied. Differences between drone A and drone B are readily seen, in that drone A shows regular offset intervals of 1.25 MHz covering the total bandwidth of 20 MHz, whereas drone B covers essentially the same bandwidth, but uses only four carrier frequencies, with offsets of 8 MHz and 9 MHz, respectively, with respect to the central frequency.

As another visual example, each of FIG. 4A and FIG. 4B shows a symbolic autocorrelation 400 of a radio signal, which was created as part of an analysis performed in a radio signal analyzer 104 included in the drone classification device 100 in accordance with various embodiments. The autocorrelation in FIG. 4A originates from drone A, and the autocorrelation in FIG. 4B originates from drone B.

The autocorrelation may be indicative of repetitive signal patterns, for example a preamble or a cyclic prefix in the data, which may show their characteristics without decoding the actual contents.

As can be seen in FIG. 4A, drone A shows such a repetitive pattern with an interval of 64 lags, wherein the lags correspond to the sampling frequency of the radio signal receiver 102. With a sampling frequency of 20 MHz, the repetition period may thus correspond to approximately 3.2 µs.

The autocorrelation 400 of drone B shown in FIG. 4B shows many repetitive patterns. The shortest prominent repetition signal may be at about 400 lags, which may, at a sampling frequency of 20 MHz, correspond to about 20 µs.

To summarize, both the analysis of the power spectra of the received radio signal shown in FIGS. 3A and 3B, and the analysis of the autocorrelation of the received radio signal may allow to classify drone A (e.g., its manufacturer, model, etc.) into a drone class, and to classify drone B (e.g., its manufacturer, model, etc.) into a further drone class.

An analysis of further drones 108, e.g. in the lab, and a storing of the respective physical characteristics in the database, may allow a classification into a drone class of the plurality of drone classes of these further drones 108. A case of not finding a matching drone for a received radio signal in the database may result in assigning the class "unknown" (or the like).

FIG. 5 shows a flow diagram 500 of a method of classifying drones in accordance with various embodiments.

The method may include receiving a radio signal (510), determining physical characteristics of the received radio signal (520), comparing the determined physical characteristics of the received radio signal with a plurality of reference characteristics, each reference characteristics describing a drone class of a plurality of drone classes (530), and classifying a drone into a drone class of a plurality of drone classes depending on a result of the comparison (540).

Various examples will be illustrated in the following:

Example 1 is a drone classification device. The drone classification device includes a radio signal receiver configured to receive a radio signal, and a radio signal analyzer configured to determine physical characteristics of the received radio signal, to compare the determined physical characteristics of the received radio signal with a plurality of reference characteristics, each reference characteristics describing a drone class of a plurality of drone classes, and to classify a drone into a drone class of a plurality of drone classes depending on a result of the comparison.

In Example 2, the subject-matter of Example 1 may optionally include that the physical characteristics include at least one of a group of physical characteristics, the group including a carrier frequency of the received radio signal, locations of peaks in a spectral correlation function of the received radio signal, a characteristic time of using a first carrier frequency in the received radio signal before switching to a different second carrier frequency, and a frequency shift in the received radio signal caused by motions of the drone.

In Example 3, the subject-matter of Example 1 may optionally include that the determining physical characteristics includes at least one of a group of processes performed on the received radio signal, the group including creating a spectral correlation function, creating a periodogram, autocorrelating the received radio signal, creating a spectrogram, applying a wavelet transform, applying a time smoothing algorithm, creating a spectral kurtosis, and creating a power cepstrum.

In Example 4, the subject-matter of Example 1 may optionally include that a carrier frequency of the received radio signal is in a range from about 2 GHz to about 6 GHz, for example between 2.4 GHz and 2.5 GHz or between 5.725 GHz and 5.875 GHz.

In Example 5, the subject-matter of Example 1 may optionally further include that a radio signal reader configured to extract communication data frame information from the received radio signal and to combine the extracted information with the assigned drone classification.

In Example 6, the subject-matter of Example 1 may optionally include that the radio signal analyzer is configured to apply a machine learning model for determining the physical characteristics of the received radio signal.

In Example 7, the subject-matter of Example 1 may optionally include that the received radio signal is a cyclostationary radio signal.

In Example 8, the subject-matter of Example 1 may optionally include that the plurality of drone classes include at least one of a group of classes including a manufacturer, a series, a model, and a type.

In Example 9, the subject-matter of Example 1 may optionally include that the radio signal includes at least one of a group of radio signals including a radio signal transmitted to a drone, a radio signal transmitted by the drone, and a radio signal transmitted to and reflected by the drone.

Example 10 is a method of classifying drones. The method may include receiving a radio signal, determining physical characteristics of the received radio signal, comparing the determined physical characteristics of the received radio signal a plurality of reference characteristics, each reference characteristics describing a drone class of a plurality of drone classes, and classifying a drone into a drone class of a plurality of drone classes depending on a result of the comparison.

In Example 11, the subject-matter of Example 10 may optionally include that the physical characteristics include at least one of a group of physical characteristics, the group including a carrier frequency of the received radio signal, locations of peaks in a spectral correlation function of the received radio signal, a characteristic time of using a first carrier frequency in the received radio signal before switching to a different second carrier frequency, and a frequency shift in the received radio signal caused by motions of the drone.

In Example 12, the subject-matter of Example 10 may optionally include that the determining the physicals characteristics includes at least one of a group of processes performed on the received radio signal, the group including creating a spectral correlation function, creating a periodogram, autocorrelating the received radio signal, creating a spectrogram, applying a wavelet transform, applying a time smoothing algorithm, creating a spectral kurtosis, and creating a power cepstrum.

In Example 13, the subject-matter of Example 10 may optionally include that a carrier frequency of the received radio signal is in a range from about 2 GHz to about 6 GHz, for example between 2.4 GHz and 2.5 GHz or between 5.725 GHz and 5.875 GHz.

In Example 14, the subject-matter of Example 10 may optionally further include extracting communication data frame information from the received radio signal, and combining the extracted information with the assigned drone classification.

In Example 15, the subject-matter of Example 10 may optionally include applying a machine learning model for determining the physical characteristics.

In Example 16, the subject-matter of Example 10 may optionally include that the received radio signal is a cyclostationary radio signal.

In Example 17, the subject-matter of Example 10 may optionally include that the plurality of drone classes includes at least one of a group of drone classes, the group including a manufacturer, a series, a model, and a type.

In Example 18, the subject-matter of Example 10 may optionally include that the radio signal includes at least one of a group of radio signals including a radio signal transmitted to a drone, a radio signal transmitted by the drone, and a radio signal transmitted to and reflected by the drone.

Example 19 is a non-transitory machine-readable storage medium having instructions encoded thereon that, when executed by one or more processors, cause a process to be carried out for classifying a drone, the process including receiving a radio signal, determining physical characteristics of the received radio signal, comparing the determined physical characteristics of the received radio signal a plurality of reference characteristics, each reference characteristics describing a drone class of a plurality of drone classes, and classifying a drone into a drone class of a plurality of drone classes depending on a result of the comparison.

In Example 20, the subject matter of Example 19 may optionally include that the physical characteristics include at least one of a group of physical characteristics, the group including a carrier frequency of the received radio signal, locations of peaks in a spectral correlation function of the received radio signal, a characteristic time of using a first carrier frequency in the received radio signal before switching to a different second carrier frequency, and a frequency shift in the received radio signal caused by motions of the drone.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A drone classification device, comprising:
a radio signal receiver configured to receive a radio signal; and
a radio signal analyzer configured to:
determine physical characteristics of the received radio signal;
compare the determined physical characteristics of the received radio signal with a plurality of reference characteristics, each reference characteristic describing a drone class of a plurality of drone classes; and
classify a drone into a drone class of a plurality of drone classes depending on a result of the comparison;
wherein the determining physical characteristics comprises at least one of a group of processes performed on the received radio signal, the group comprising:
creating a spectral correlation function;
creating a periodogram;
autocorrelating the received radio signal;
creating a spectrogram;
applying a wavelet transform;
applying a time smoothing algorithm;
creating a spectral kurtosis; and
creating a power cepstrum.

2. The drone classification device of claim 1,
wherein the physical characteristics comprise at least one of a group of physical characteristics comprising:
a carrier frequency of the received radio signal;
locations of peaks in a spectral correlation function of the received radio signal;
a characteristic time of using a first carrier frequency in the received radio signal before switching to a different second carrier frequency;
a frequency shift in the received radio signal caused by motions of the drone.

3. The drone classification device of claim 1,
wherein a carrier frequency of the received radio signal is in a range from about 2 GHz to about 6 GHz.

4. The drone classification device of claim 1, further comprising:
a radio signal reader configured to extract communication data frame information from the received radio signal and to combine the extracted information with the assigned drone classification.

5. The drone classification device of claim 1,
wherein the radio signal analyzer is configured to apply a machine learning model for comparing the determined physical characteristics with the plurality of reference characteristics.

6. The drone classification device of claim 1,
wherein the received radio signal is a cyclostationary radio signal.

7. The drone classification device of claim 1,
wherein the plurality of drone classes include at least one of a group of classes comprising:
a manufacturer;
a series;
a model; and
a type.

8. The drone classification device of claim 1,
wherein the radio signal comprises at least one of a group of radio signals comprising:
a radio signal transmitted to a drone;
a radio signal transmitted by the drone; and
a radio signal transmitted to and reflected by the drone.

9. A method of classifying drones, the method comprising:
receiving a radio signal;
determining physical characteristics of the received radio signal;
comparing the determined physical characteristics of the received radio signal a plurality of reference characteristics, each reference characteristic describing a drone class of a plurality of drone classes; and
classifying a drone into a drone class of a plurality of drone classes depending on a result of the comparison;
wherein the determining physical characteristics comprises at least one of a group of processes performed on the received radio signal, the group comprising:
creating a spectral correlation function;
creating a periodogram;
autocorrelating the received radio signal;
creating a spectrogram;
applying a wavelet transform;
applying a time smoothing algorithm;
creating a spectral kurtosis; and
creating a power cepstrum.

10. The method of claim 9,
wherein the physical characteristics comprise at least one of a group of physical characteristics comprising:
a carrier frequency of the received radio signal;
locations of peaks in a spectral correlation function of the received radio signal;
a characteristic time of using a first carrier frequency in the received radio signal before switching to a different second carrier frequency;
a frequency shift in the received radio signal caused by motions of the drone.

11. The method of claim 9,
wherein a carrier frequency of the received radio signal is in a range from about 2 GHz to about 6 GHz.

12. The method of claim 9, further comprising:
extracting communication data frame information from the received radio signal; and
combining the extracted information with the assigned drone classification.

13. The method of claim 9,
applying a machine learning model for comparing the determined physical characteristics with the plurality of reference characteristics.

14. The method of claim 9,
wherein the received radio signal is a cyclostationary radio signal.

15. The method of claim 9,
wherein the drone class comprises at least one of a group of drone classes, the group comprising:
a manufacturer;
a series;
a model; and
a type.

16. The method of claim 9,
wherein the radio signal comprises at least one of a group of radio signals comprising:
a radio signal transmitted to a drone;
a radio signal transmitted by the drone; and
a radio signal transmitted to and reflected by the drone.

17. A non-transitory machine-readable storage medium having instructions encoded thereon that, when executed by one or more processors, cause one or more processors to:
receive a radio signal;
determine physical characteristics of the received radio signal;
compare the determined physical characteristics of the received radio signal a plurality of reference characteristics, each reference characteristic describing a drone class of a plurality of drone classes; and classify a drone into a drone class of a plurality of drone classes depending on a result of the comparison;

wherein the determining physical characteristics comprises at least one of a group of processes performed on the received radio signal, the group comprising:

creating a spectral correlation function;

creating a periodogram;

autocorrelating the received radio signal;

creating a spectrogram;

applying a wavelet transform;

applying a time smoothing algorithm;

creating a spectral kurtosis; and creating a power cepstrum.

18. The machine-readable storage medium of claim 17, wherein the physical characteristics comprise at least one of a group of physical characteristics comprising:

a carrier frequency of the received radio signal;

locations of peaks in a spectral correlation function of the received radio signal;

a characteristic time of using a first carrier frequency in the received radio signal before switching to a different second carrier frequency;

a frequency shift in the received radio signal caused by motions of the drone.

* * * * *